United States Patent
Randall

(10) Patent No.: US 6,900,417 B2
(45) Date of Patent: May 31, 2005

(54) HOSE HEATER

(75) Inventor: Thomas Randall, Millersburg, OH (US)

(73) Assignee: SeaLand Technology, Inc., Big Prairie, OH (US)

(*) Notice: Subject to any disclaimer, the term of this patent is extended or adjusted under 35 U.S.C. 154(b) by 167 days.

(21) Appl. No.: 10/236,994

(22) Filed: Sep. 6, 2002

(65) Prior Publication Data

US 2003/0042250 A1 Mar. 6, 2003

Related U.S. Application Data

(60) Provisional application No. 60/317,131, filed on Sep. 6, 2001.

(51) Int. Cl.⁷ ................................. H05B 3/58
(52) U.S. Cl. ................ 219/535; 219/227; 219/243; 156/294; 156/304.2; 156/499
(58) Field of Search ................ 219/535, 544, 219/227–228, 243; 156/294, 499, 304.2; 285/41

(56) References Cited

U.S. PATENT DOCUMENTS

| | | | |
|---|---|---|---|
| 2,785,267 A | * 3/1957 | Wickersham et al. | 219/239 |
| 2,958,906 A | * 11/1960 | Youthed | 156/294 |
| 3,192,612 A | * 7/1965 | Elliott et al. | 29/890.15 |
| 3,802,943 A | * 4/1974 | Province | 156/583.1 |
| 3,994,515 A | * 11/1976 | Cotten | 285/21.2 |
| 4,792,374 A | 12/1988 | Rianda | |
| 5,087,308 A | 2/1992 | Wermelinger | |
| 5,786,572 A | * 7/1998 | Tonazzi | 219/523 |
| 6,118,108 A | * 9/2000 | Ufford | 219/535 |

FOREIGN PATENT DOCUMENTS

| | | | |
|---|---|---|---|
| DE | 41 38 608 A | | 5/1993 |
| EP | 314970 | * | 5/1989 |
| GB | 2 001 147 A | | 1/1979 |
| JP | 55-51528 | * | 4/1980 |
| JP | 55-55823 | * | 4/1980 |
| WO | 80 02124 A | | 10/1980 |
| WO | 96 40486 A | | 12/1996 |

OTHER PUBLICATIONS

Patent Abstracts of Japan, vol. 013, No. 055, Feb. 8, 1989 & JP 63 260429 A (Daizaburo Tsukamoto), Oct. 27, 1988.

* cited by examiner

Primary Examiner—John A. Jeffery
(74) Attorney, Agent, or Firm—Pearne & Gordon LLP

(57) ABSTRACT

An apparatus for aiding an individual using a plastic hose or pipe in an assembly or installation. The apparatus heats an end of the hose or pipe to soften the plastic, or other heat softenable material, thus making the end pliable, thereby allowing the hose or pipe to be more easily mated with a corresponding component. The apparatus is adapted for preventing the interior and/or exterior of the hose or pipe from deforming during the heating process.

12 Claims, 5 Drawing Sheets

HOSE HEATER

This application claims the benefit of provisional patent application Ser. No. 60/317,131, filed on Sep. 6, 2001, incorporated herein by reference.

This application relates generally to a method and a device for aiding in the installation of a hose or pipe, and in particular to heating a plastic hose or pipe to increase its flexibility to allow it to be easily installed and/or connected in tight-fitting situations.

BACKGROUND OF THE INVENTION

Assembling plastic hoses and/or pipes, such as those made of PVC, for example, can be difficult because such hoses and pipes often have variations in their inner and/or outer diameters from their required specifications. This can be because of difficulty in maintaining the proper diameters during manufacturing, or because of temperature variations in the work environment, or due to cutting or other processing of the hoses or pipes, for example.

These diameter variations can make it difficult to mate and/or assemble these hoses and pipes with other hoses or pipes, or to whatever device or component they are to be attached. Further, it is often desirable to minimize the play between pipes or hoses to be mated to ensure a good seal. Thus, the outer diameter of a pipe or hose to be inserted in a receiving pipe or hose is often desired to be very close in tolerance to the inner diameter of the receiving pipe or hose.

By heating the pipe or hose, a portion of the pipe or hose (such as an end) can be made somewhat soft and pliable, making it easier to mate the pipe or hose with another fitting part or device (such as another pipe or hose). This would allow easier and often more accurate fitting to be practiced. An apparatus and/or method to facilitate this process would be desirable.

SUMMARY OF THE INVENTION

Provided is an apparatus for aiding in the installation or assembly of a hose or pipe, with the apparatus comprising a heater and a mandrel connected to the heater. The heater is adapted for heating the hose or pipe to soften a portion of the hose or pipe to aid in the installation or assembly using the hose or pipe. Further, the mandrel is adapted for inserting inside the hose or pipe to maintain the shape of the hose or pipe during the heating.

Also provided is an apparatus comprising: a mandrel; a heater connected to the mandrel; a handle also connected to the mandrel; and a shroud also connected to the handle. The mandrel is at least partially within the shroud, with the shroud forming a cavity between the shroud and the mandrel, the cavity being capable of receiving a hose or pipe.

Further provided is an apparatus comprising: a mandrel; a heater at least partially inserted within the mandrel; a handle connected to the mandrel; and a shroud connected to the handle. The mandrel is at least partially within the shroud, with the shroud forming a cavity between the shroud and the mandrel, the cavity being capable of receiving a hose or pipe.

The heater is adapted for use by an individual for heating the hose or pipe to soften some portion of the hose or pipe. The mandrel is adapted for inserting inside the hose or pipe for maintaining the shape of the interior of the hose or pipe during heating. Further, during use, the shroud at least partially covers some portion of the exterior of the hose or pipe to maintain the shape of the exterior of the hose or pipe during the heating.

Still further provided is a an apparatus comprising: a mandrel including a heat-conducting material; a heater at least partially inserted within the mandrel; a handle connected to the mandrel; and a shroud including a heat-insulating material connected to the handle. The mandrel is at least partially within the shroud, with the shroud forming a cavity between the shroud and the mandrel. The cavity is capable of receiving an end of a hose or pipe.

Further, the heater is adapted for heating the end of the hose or pipe to soften the end of the hose or pipe, while the mandrel is adapted for inserting inside the end of the hose or pipe to maintain the shape of the interior of the end of the hose or pipe during use. The shroud at least partially covers some portion of the exterior of the end of the hose or pipe to maintain the shape of the exterior of the end of the hose or pipe. The softened end of the hose or pipe can then be removed from the apparatus, thereby permitting the hose or pipe to be installed or assembled with another device or component.

Even further provided is an apparatus for aiding an installation or assembly using a hose or pipe, the apparatus comprising a heater for heating the hose or pipe to soften a portion of the hose or pipe permitting the hose or pipe to be installed or assembled with another device or component.

And still further provided is an apparatus for aiding in the installation or assembly of a hose or pipe, the apparatus comprising: a heater; a mandrel including a heat-conducting material connected to the heater; and a shroud including a heat-insulating material connected to the handle or mandrel. The mandrel is at least partially within the shroud, while the shroud forms a cavity between the shroud and the mandrel, with the cavity capable of receiving an end of a hose or pipe.

The apparatus can be used to aid in the installation or assembly of the hose or pipe by performing the steps of:
  inserting an end of the hose or pipe into the cavity;
  heating the end of the hose or pipe with the heater to soften the end; and
  removing the apparatus from the end of the hose or pipe, thereby permitting the hose or pipe to be installed or assembled with another device or component.

DETAILED DESCRIPTION OF THE PREFERRED EMBODIMENTS

A device for heating a portion of a hose or pipe (such as an end of the hose or pipe) made of plastic or some other material that can be softened by heating, thus facilitating assembly to another hose, pipe or other component or device, is disclosed.

Figure 1:
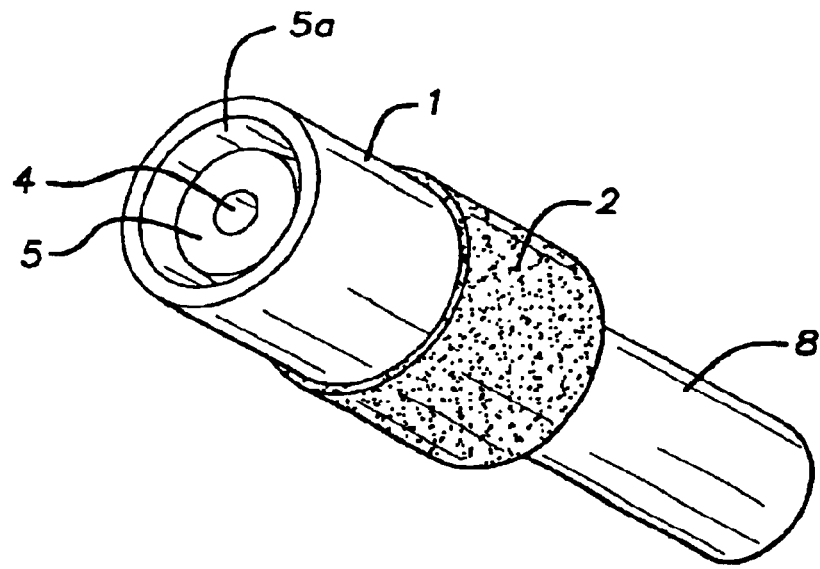
FIG. 1 shows a perspective view of a partial embodiment of the device showing a front portion.
Figure 2:
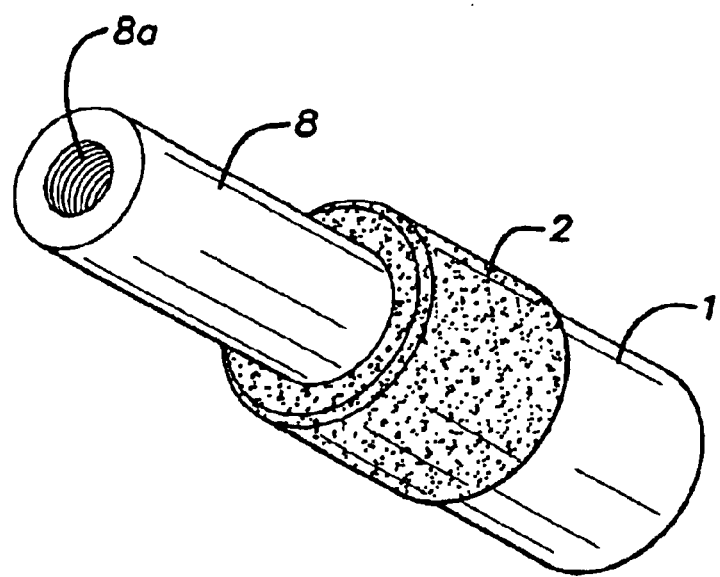
FIG. 2 shows a shows another perspective view of the partial embodiment of the device showing a rear portion.
Figure 3:
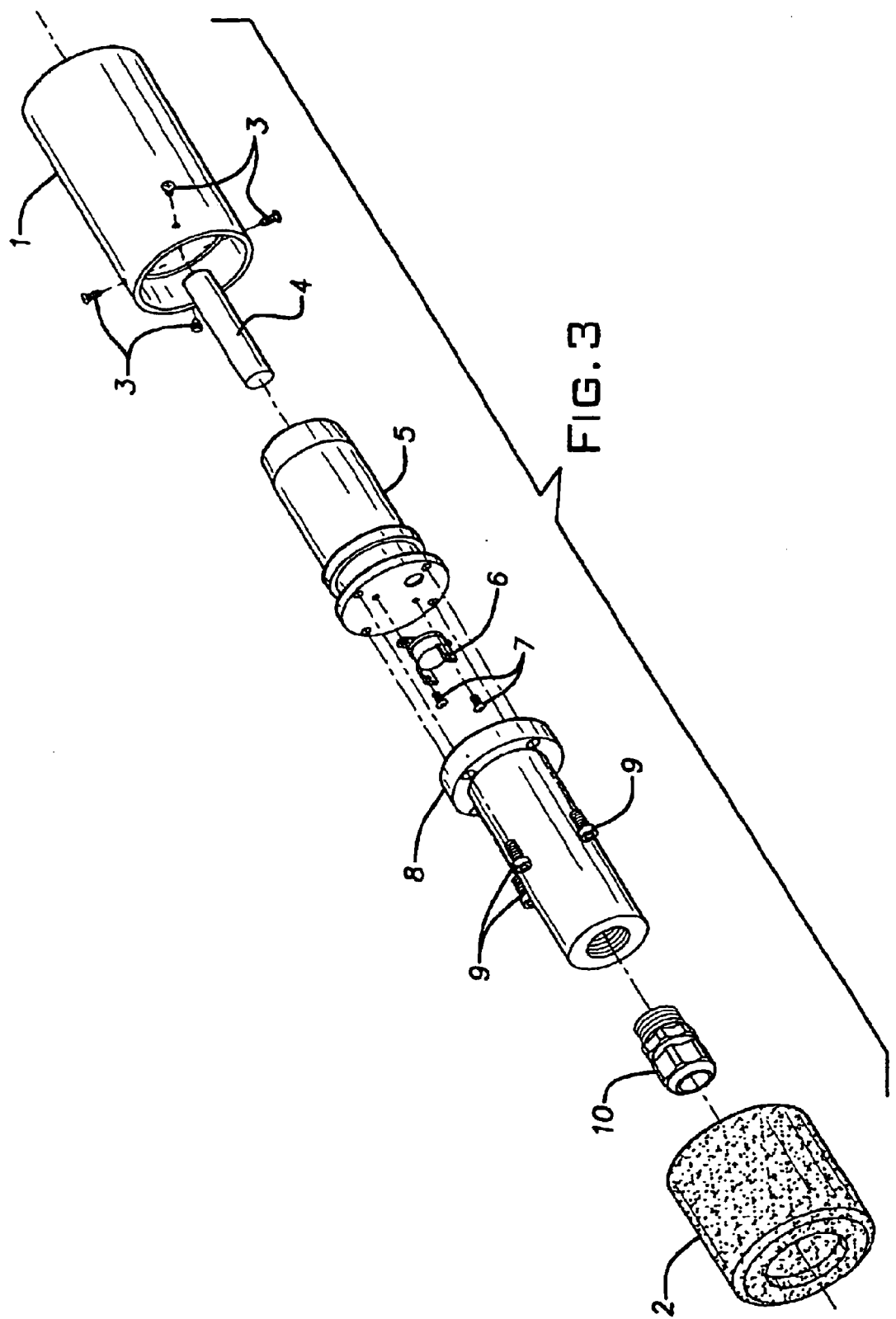
FIG. 3 shows an exploded view of a more complete partial embodiment of the apparatus.
Figure 4:
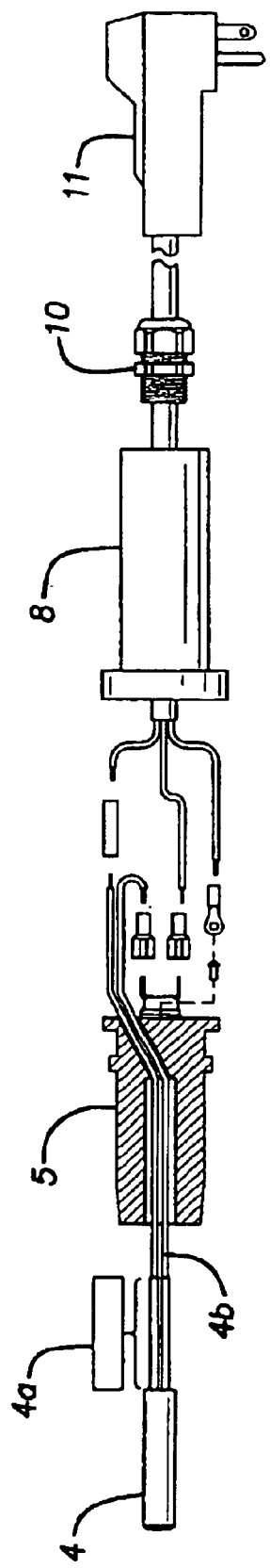
FIG. 4 shows an exploded view of mostly the primary electrical components of the embodiment.
Figure 5:
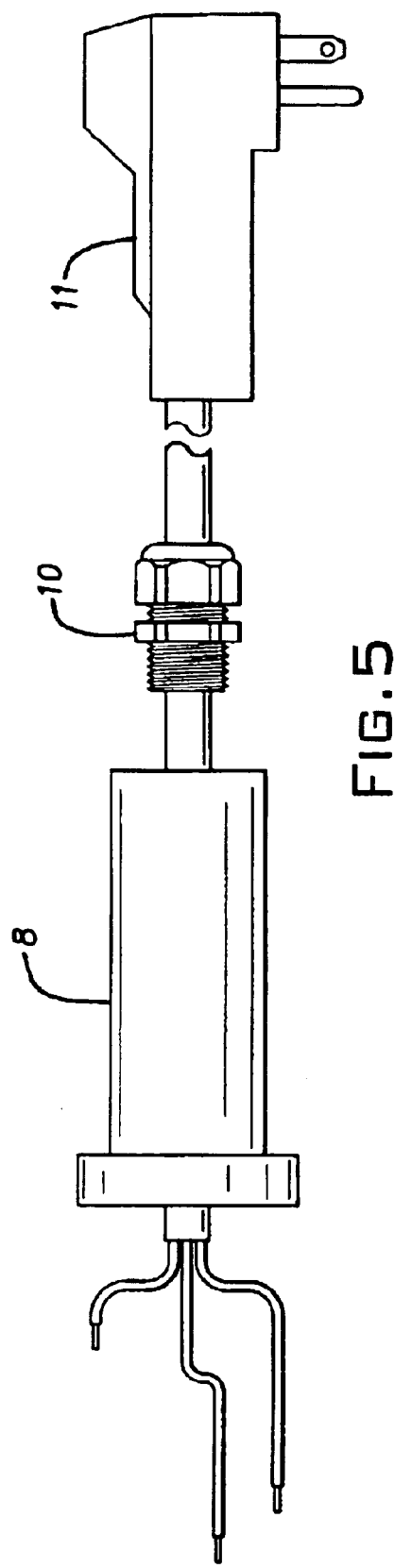
FIG. 5 shows another exploded view of the primary electrical components of the embodiment.
Figure 6:
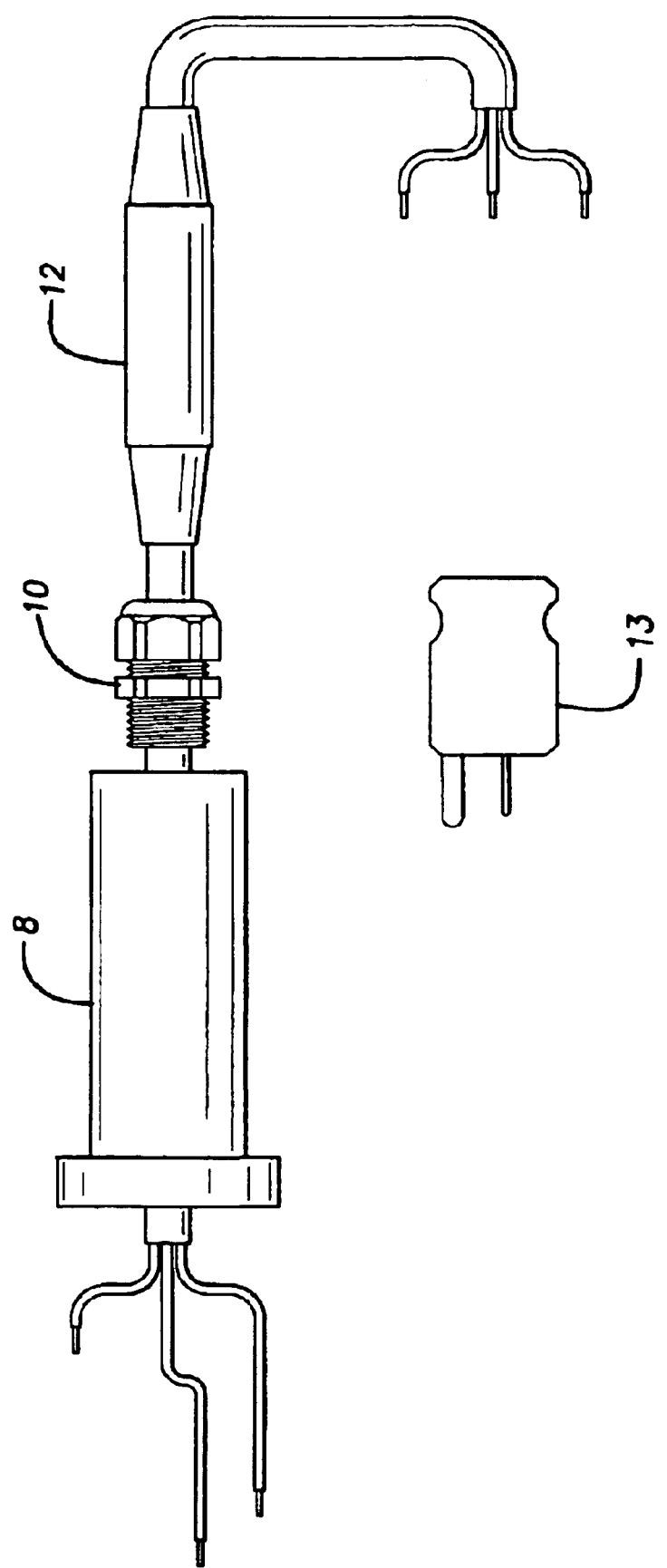
FIG. 6 shows an exploded view of alternative primary electrical components of another embodiment.

FIGS. 1 and 2 show different views of an embodiment of the apparatus in a simplified figure, while FIG. 3 shows the apparatus' major components in a pre-assembled layout. FIG. 4 shows the apparatus with electrical wiring detail for an embodiment using an electric heater. The apparatus comprises a shroud 1 with a sleeve 2 covering a portion of the shroud. The sleeve 2 is preferably comprised of a heat-insulating material (such as cork, or a PVC foam, for example) to protect the user from contact with the shroud 1, which might become hot during use. If the shroud is not a good conductor of heat and does not become substantially hot, the sleeve 2 may not be necessary.

A handle 8 is included so that a user can grasp the apparatus during use. The handle 8 will typically need an exit 8A for electrical wires to exit, if an electric heater is used. The shroud 1 is connected to the handle 8, such as, for example, using rivets, bolts, or screws 3, or some other means of fastening, to fix the shroud 1 to the handle 8.

A mandrel 5 is at least partially contained within the shroud 1, with the mandrel 5 also being connected and fixed to the handle 8, such as, for example, by using rivets, bolts, or screws 9, or some other means of fastening. Alternatively, the shroud 1 could be directly attached to the mandrel 5, with the handle being attached to one or both of the shroud 1 and/or the mandrel 5. Any of these attachment methods would be acceptable.

The mandrel 5 is placed within the shroud 1 such that the shroud 1 forms a substantially cylindrical-shaped gap or cavity 5A between mandrel 5 and the shroud 1, with the gap or cavity 5A being open at one end. The cylindrical shape of the gap or cavity 5A can be formed by using a mostly cylindrical mandrel 5 along with a mostly cylindrical shroud 1. The gap or cavity 5A should be of sufficient size to receive the portion (such as an end) of the hose or pipe to be worked upon and heated.

Alternatively, the gap or cavity 5A may be of some other shape rather than cylindrical, if the hose or pipe is of a different shape. In that case, the gap or cavity 5A shape should correspond to the shape of the hose or pipe end to be inserted. Oval, square, rectangular, triangular, or other geometric shapes can all be accommodated by modifying the shape of the cavity 5A (by modifying the shapes of the mandrel 5 and/or the shroud 1).

In a preferred embodiment, the gap or cavity 5A should at least somewhat snugly receive the portion of the hose or pipe to be worked upon and heated, because, in a snug fit, the shroud 1 helps prevent the exterior of the hose or pipe from overly deforming or wrinkling during heating, while the mandrel 5 helps prevent the interior of the portion of the hose or pipe to be worked upon and heated from overly deforming or wrinkling. In this case, the mandrel shape and outer diameter should closely correspond to the inner diameter of the hose or pipe to be worked on, while the shroud 1 shape and inner diameter should closely correspond to the outer diameter of the hose or pipe. Some leeway might need to be provided in the size of the cavity 5A (and thereby the sizes of the mandrel 5 and/or the shroud 1) to accommodate manufacturing variances in the hose or pipe diameters.

Further, the mandrel 5 may be made slightly tapered, such that, as the portion of the hose or pipe to be worked upon and heated is softened, the apparatus may be used to slightly expand the inner diameter of the hose or pipe to further facilitate assembly (as described in more detail below). Alternatively, the shroud 1 could be slightly tapered to reduce the outer diameter of the hose or pipe (as discussed below). Tapering might also be used to allow the apparatus to accommodate hoses and/or pipes of varying sizes and/or shapes.

The embodiment in the FIGURES show a heater 4 inserted into the mandrel 5. However, alternative embodiments might include the heater within the shroud 1, or further alternatives might integrate the heater more fully with the mandrel 5, without departing from the spirit of the invention. The preferred embodiment uses an electric rod heater 4, with the electrical wires for the heater exiting the exit 8A. A thermostat 6, preferably mounted on the mandrel 5, is provided to allow temperature control of the heater. Alternative mounting of the thermostat might include integrating the thermostat in the heater 4, for example.

Alternative heater designs might also be used, such as a gas-powered (e.g., propane) heater, without departing from the spirit of the invention.

The mandrel 5 is preferably made from a heat-conducting material, such as aluminum, for example, to conduct the heat from the rod heater 4 to the interior of the hose or pipe being worked on. The shroud 1 could then be made of an insulating material to help keep the heat contained within the device to faster heat the hose or pipe. The heat insulating properties of the sleeve 2 can also help keep the heat within the device.

If the heater is alternatively contained within the shroud 1, then the shroud 1 could be made of a heat-conducting material to transmit the heat to the hose or pipe, whereas the mandrel 5 would likely then include an insulating material. However, placing the heater within the mandrel 5 is seen as preferable because it best protects the user from contact with the heat-generating and/or heat-transmitting components.

Figure 7:
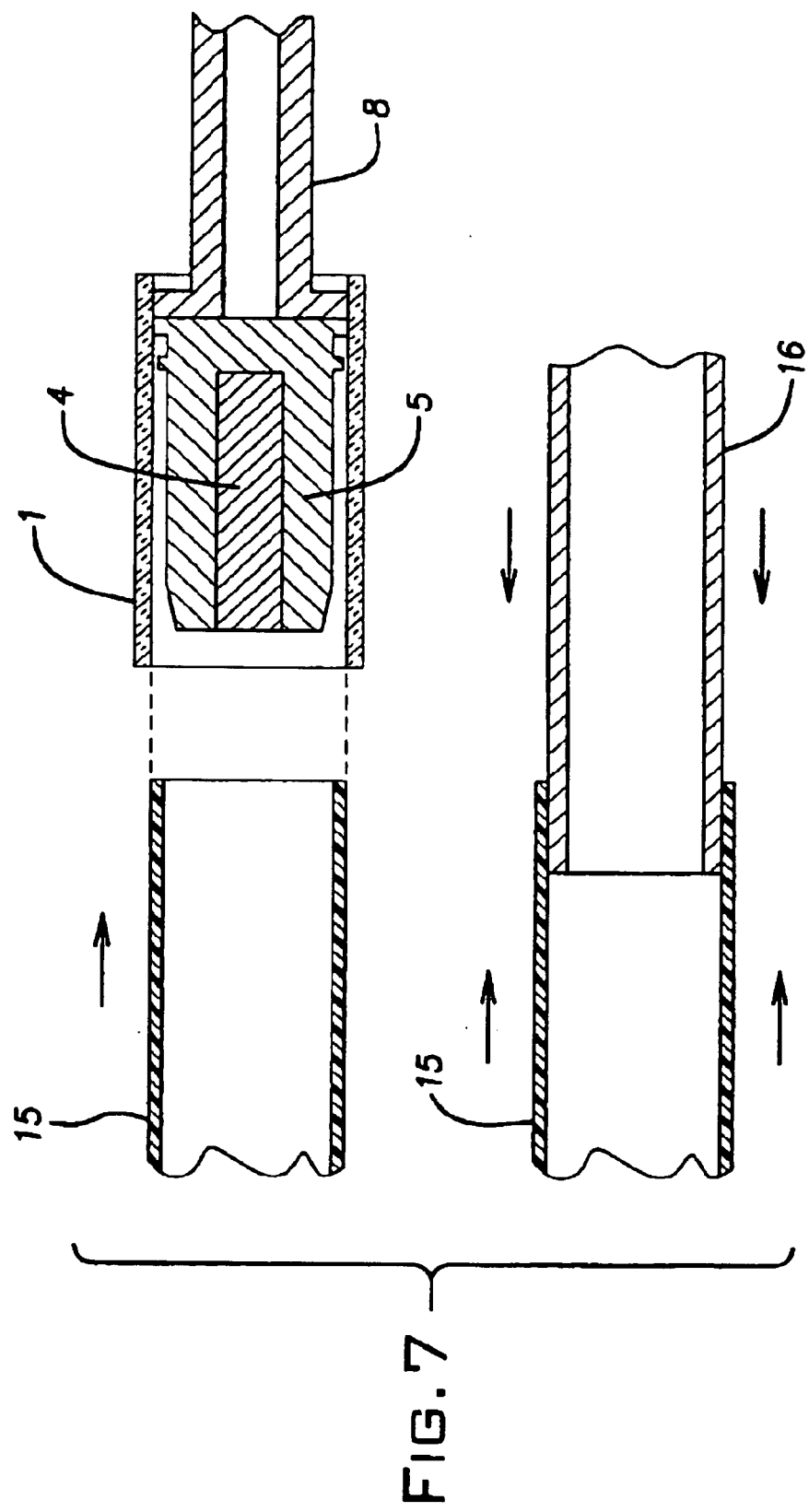
FIG. 7 shows cross-sectional views of a partial embodiment of the invention in a position to receive the end of a hose to be heated and the subsequent mating of the end of the hose after it is heated to a component such as another hose or pipe.

The primary use of the apparatus will now be revealed:

The apparatus is held by a user holding the handle 8. The end of the apparatus (having the cavity 5A opening) is placed over the end of the hose or pipe 15 (see FIG. 7 to be worked on, for example, with the hose or pipe inserted into the apparatus such that the end of the hose or pipe is inserted within the cavity 5A as indicated by the arrow in the upper portion of FIG. 7. It is preferable that the hose or pipe fit snugly within the cavity against the mandrel 5 (against the interior of the end of the hose or pipe 15), and the shroud 1 (against the exterior of the end of the hose or pipe 15), so that the mandrel 5 and the shroud 1 are in constant contact with the hose or pipe (although the device can also be used for less snug fits as well). The heater 4 is used to heat the mandrel, which conducts the heat of the heater to the end of the hose or pipe 15 thereby softening the material of the end and thereby making it pliable, as desired.

The snug fit of the end of the hose or pipe 15 against mandrel 5 and the shroud 1 are desirable primarily for ensuring that the end of the hose or pipe maintains its proper shape, without wrinkling or buckling. Once the end of the hose or pipe 15 is sufficiently heated and thus softened, the hose or pipe can be mated with another hose, pipe, or other device or component 16, as desired, as indicated by the arrows in the lower portion of FIG. 7. The opposite component 16 to be mated to may be comprised of any number of substances, from plastics to metals to ceramics, or any other substance.

The softened, pliable end of the hose or pipe 15 will then be easier to mate with the opposing component 16 because the softened end can deform slightly, and thereby permit the mating to more easily occur. After mating, the end of the hose or pipe is allowed to cool, and thus harden, forming the necessary seal or mating contact. If necessary, additional sealing means, such as the use of a glue, a gasket, a clamp, or some other type of seal can be utilized to permanently mate the hose or pipe 15 to the opposite component 16.

As an alternative, the mandrel 5 or the shroud 1 might be made slightly tapered (with the mandrel 5 growing wider toward the handle, and/or the shroud 1 diameter growing less toward the handle—although other tapering schemes might also be useful). By pressuring the apparatus toward the hose or pipe during softening, a tapered mandrel or shroud (or both) could be used to slightly increase the inner diameter of the end hose or pipe, or slightly decrease the outer diameter of the hose or pipe, respectively, to further facilitate assembly with the opposite component. The slight tapering will help ensure a tight fit.

The invention has been described hereinabove using specific examples of embodiments; however, it will be understood by those skilled in the art that various alternatives may be used and equivalents may be substituted for elements, components, or steps described herein, without deviating from the scope of the invention. Modifications may be necessary to adapt the invention to a particular situation or to particular needs without departing from the scope of the invention. It is intended that the invention not be limited to the particular embodiments described herein, but that the claims be given their broadest interpretation to cover all embodiments, literal or equivalent, covered thereby.

What is claimed is:

1. An apparatus for aiding in the installation or assembly of a hose or pipe, said apparatus comprising:

a heater;

a mandrel of a heat-conducting material connected to said heater;

wherein said heater is adapted for heating said hose or pipe to soften a portion of said hose or pipe to aid in the installation or assembly using said hose or pipe, and further wherein said mandrel is adapted for inserting inside said hose or pipe to maintain the shape of said hose or pipe during said heating; and a shroud of a heat-insulating material covering said portion of said hose or pipe during heating.

2. The apparatus of claim 1 further comprising a handle connected to said mandrel, said handle also being connected to said shroud.

3. The apparatus of claim 2, wherein said heater is at least partially inserted within said mandrel.

4. The apparatus of claim 3 further comprising a sleeve of a heat-insulating material at least partially surrounding an exterior of said shroud.

5. The apparatus of claim 1 further comprising a handle connected to said mandrel.

6. The apparatus of claim 5, wherein said shroud forms a cavity between said shroud and said mandrel, said cavity capable of receiving a hose or pipe.

7. The apparatus of claim 6 further comprising a sleeve of a heat-insulating material at least partially surrounding an exterior of said shroud.

8. The apparatus of claim 6, wherein said apparatus is used to aid in the installation or assembly using said hose or pipe by performing the steps of:

inserting an end of said hose or pipe into said cavity, wherein said mandrel is inserted in an opening in said end, and further wherein said shroud at least partially covers some portion of the outside of said end of said hose or pipe;

heating said end of said hose or pipe with said heater to soften said end; and removing said apparatus from said end of said hose or pipe thereby permitting said hose or pipe to be installed or assembled with another device or component.

9. The apparatus of claim 8, wherein, during said heating of said end of said hose or pipe, said mandrel is adapted for inserting inside said hose or pipe for maintaining the shape of the interior of said hose or pipe during heating, and further wherein said shroud at least partially covers some portion of the exterior of said hose or pipe to maintain the shape of the exterior of said hose or pipe during said heating.

10. The apparatus of claim 1, wherein said heater is at least partially inserted within said mandrel.

11. The apparatus of claim 1, wherein said apparatus is used to aid in the installation or assembly use of said hose or pipe by performing the steps of:

inserting an end of said hose or pipe into a cavity in said apparatus, wherein said mandrel is inserted in an opening in said end;

heating said end of said hose or pipe with said heater to soften said end; and removing said apparatus from said end of said hose or pipe thereby permitting said hose or pipe to be installed or assembled with another device or component.

12. The apparatus of claim 1 wherein said shroud forms a cavity between said shroud and said mandrel and wherein said apparatus is used to aid in the installation or assembly of a hose or pipe by performing the steps of:

inserting an end of said hose or pipe into said cavity;

heating said end of said hose or pipe with said heater to soften said end; and removing said apparatus from said end of said hose or pipe thereby permitting said hose or pipe to be installed or assembled with another device or component.

* * * * *